United States Patent [19]

Acharya et al.

[11] 4,325,853

[45] Apr. 20, 1982

[54] HOT MELT ADHESIVE COMPOSITIONS CONTAINING ROSIN ESTERS

[75] Inventors: Vikramkumar Acharya; Pallavoor R. Lakshmanan, both of Houston, Tex.

[73] Assignee: Gulf Oil Corporation, Pittsburgh, Pa.

[21] Appl. No.: 229,389

[22] Filed: Jan. 28, 1981

Related U.S. Application Data

[63] Continuation-in-part of Ser. No. 174,296, Jul. 31, 1980, abandoned.

[51] Int. Cl.$^3$ .................... C08L 93/04; C08F 218/08
[52] U.S. Cl. ................................... 524/272; 525/327
[58] Field of Search ......... 525/327; 260/27 R, 27 EV

[56] References Cited

U.S. PATENT DOCUMENTS

| | | | |
|---|---|---|---|
| 3,485,783 | 12/1969 | Kehe | 260/27 R |
| 3,896,069 | 7/1975 | Kosaka et al. | 260/27 EV |
| 4,146,521 | 3/1979 | Godfrey | 260/27 R |
| 4,158,664 | 6/1979 | Selintz | 562/593 |

OTHER PUBLICATIONS

Payne-Organic Coating Technology, vol. I, Wiley & Sons, N.Y. (1954), pp. 183–184, Library of Congress Cat. Card No. 54-5971.

*Primary Examiner*—H. S. Cockeram
*Attorney, Agent, or Firm*—Richard L. Kelly

[57] ABSTRACT

Hot melt adhesive compositions are provided which contain (a) about 10–30 weight % of an alkenyl succinic anhydride, (b) about 20–60 weight % of an ethylene copolymer, and (c) about 10–40 weight % of a tackifying resin which is a rosin ester.

9 Claims, No Drawings

HOT MELT ADHESIVE COMPOSITIONS CONTAINING ROSIN ESTERS

CROSS REFERENCE TO RELATED APPLICATIONS

This application is a continuation-in-part of our parent application Ser. No. 174,296, filed on July 31, 1980, now abandoned.

The applications identified below disclose and claim compositions similar to those disclosed and claimed herein. The compositions disclosed in these applications differ from the present invention in that the tackifying resin included therein differs from the tackifying resin included in the present invention.

Serial No.
229,401
229,394
229,400
229,390
229,639
229,204
229,351

Each of the above applications has been filed of even date herewith.

BACKGROUND OF THE INVENTION

Hot melt adhesives frequently are employed to prepare laminated structures by bonding two or more laminae together. While many satisfactory hot melt adhesives are available to the art, the art is constantly seeking new compositions having superior performance, or lower cost, or both.

SUMMARY OF THE INVENTION

The applicants have discovered hot melt adhesive compositions useful in laminating polar laminae together. The hot melt adhesive compositions of the invention contain three essential components. The first is an alkenyl succinic anhydride. The second is an ethylene copolymer. The third is a tackifying resin selected from a class described infra.

DETAILED DESCRIPTION OF THE INVENTION

The compositions of the invention contain about 10–30, preferably 15–25, and more especially about 20 weight % of the alkenyl succinic anhydride. The ethylene copolymer is present in the amount of 20–60, preferably 25–50, and more especially about 40 weight % of the composition. The tackifying resin is included in the compositions in the amount of about 10–40, preferably 15–35, and more especially about 25 weight % of the total composition. In the preferred embodiment of the invention, the three named components constitute the entire composition. Optionally, however, the compositions may contain up to about 20 weight % of additional components. An antioxidant of the type conventionally employed with ethylene polymers desirably is included in the compositions.

The alkenyl succinic anhydrides employed in the compositions of the invention are known compounds of the type described in U.S. Pat. No. 4,158,664, whose descriptions are incorporated herein by reference. These compounds are prepared by heating a high molecular weight alpha-olefin containing about 18 or more carbon atoms with maleic anhydride. Their structure is shown below:

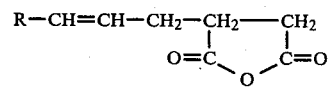

In the above formula, R is an alkyl group containing at least 15 carbon atoms. Frequently these compounds are prepared from a mixture of alpha-olefins in which each component contains a minimum of about 18 carbon atoms. In this event, R can be expressed as an average value which seldom will be in excess of 49. Preferably R will have an average value of less than 39.

The ethylene copolymers employed in the compositions of the invention will have polymerized therein at least 40 and preferably at least 60 weight % of ethylene, with the balance of the copolymer being one or more polymerized monomers selected from the group consisting of vinyl acetate, acrylic and methacrylic acid, and alkyl esters of acrylic and methacrylic acid. The preferred copolymers will contain 40–90 weight % ethylene with the balance being vinyl acetate. Where the ethylene copolymer contains an alkyl ester of acrylic or methacrylic acid, the alkyl ester preferably will be a methyl or ethyl ester. The ethylene copolymers preferably will have a melt index in the range of about 0.5–200, preferably 1–100, and more especially about 2–20. Methods for preparing such copolymers are well known in the art and certain of such copolymers are commercially available.

The tackifying resins employed in the compositions of the invention will be a rosin ester formed by esterifying a rosin acid with a di-, tri-, or tetra-hydroxy aliphatic alcohol such as ethylene glycol, propylene glycol (either the 1,2 or the 1,3 isomer), glycerine, or pentaerythritol. Such rosin esters will have a Ring and Ball softening point of about 65°–140° C. as determined by ASTM E-28-58T. The rosin acid employed will be any of the standard grades sold in commerce; the product sold under the trade designation ACINTOL R Type S being typical of acids satisfactory for use in the present invention. The typical rosin acids sold in commerce are obtained principally from tall oil and will have the following typical analysis:*

| Rosin Acids | 88–92% |
|---|---|
| Rosin Esters and Anhydrides | 4–6% |
| Unsaponifiable Matter | 2–6% |
| Fatty Acids | 1–3% |

*The presence of the minor components causes no difficulties in preparing the esters employed in the invention.

The rosin acids are mixtures of two principal types, the abietic types and the pimaric types. A typical distribution of individual acids found in commercial rosin acids is:

| Rosin Acid | Typical Analysis |
|---|---|
| Abietic Acid | 34% |
| Dehydroabietic Acid | 24% |
| Palustric Acid | 9% |
| Isopimaric Acid | 6% |
| Dihydroabietic Acid | 5% |
| Pimaric Acid | 5% |
| Neoabietic Acid | 3% |

Other individual acids sometimes found and identified in commercial rosin acids include levopimaric acid, tetrahydroabietic acid, sandaracopimaric acid, dihydropimaric acid, tetrahydropimaric acid, dihydroisopimaric acid and tetrahydroisipimaric acid.

The rosin esters are prepared by conventional esterification procedures reported in the art. A number of suitable rosin esters are commercially available, including the glyceryl ester sold under the designation Foral 85 and the pentaerythritol ester sold under the designation Foral 105.

As noted supra, in addition to the named components described above, the compositions of the invention may contain up to about 20 weight % of additional components. Such additional components typically are wax-like materials which can modify the melt viscosities of the products of the invention. Suitable materials of this type include (1) low molecular weight, liquid polybutylenes in the molecular weight range of from about 600 to 3000; (2) petroleum waxes such as paraffin wax having a melting point of from about 130°–165° F., and microcrystalline wax having a melting point of from about 140°–200° F.; the latter melting points being determined by ASTM method D 127-60; (3) polyethylene greases having a softening point of from about 80°–100° C., and a hardness value, as determined by ASTM method D-1321, of about 60–120; (4) mineral oil; (5) synthetic waxes made by polymerizing carbon monoxide and hydrogen, such as Fischer-Tropsch wax; and (6) atactic propylene polymers.

The compositions of the invention are solids at room temperature, but have melting points and melt viscosities in a range such that they can be readily applied to appropriate substrates using conventionally employed hot melt techniques and equipment. The compositions, depending upon their precise formulation, have ring and ball softening points within a range of approximately 80° to 105° C. The compositions can be formulated to have viscosities, at 400° F., from as low as about 500 cps to as high as 20,000 cps or more.

A suitable procedure for preparing the hot melt adhesive compositions involves placing the tackifying resin and the alkenyl succinic anhydride in a jacketed mixing kettle (or in a jacketed heavy duty mixer of the Baker-Perkins or Day type for compositions having high viscosities) equipped with a stirrer and thereupon raising the temperature to a range of from about 250° to 400° F., and preferably 300° to 350° F. When the initially charged components have melted, stirring is initiated and the ethylene copolymer then is added. Stirring and heating are continued until a smooth, homogeneous mass is obtained. The resulting hot melt adhesive composition is drawn off and may be used immediately in hot pots; or, it may be melt-extruded into rope form or converted into pellets, rods, cylinders, slugs, or billets depending on the equipment which will be subsequently used to apply the hot melt; or, it may be placed in cooling pans and held in bulk form for later use; or it may be granulated or diced.

The hot melt adhesive compositions of the invention give very satisfactory results in preparing laminated structures from laminae prepared from polar resins such as polyamides, acrylonitrile-butadiene-styrene resins, vinyl chloride resins, and wood. The procedural steps for bonding the laminae together are those commonly employed with other hot melt adhesives. The hot melt adhesive is applied to at least one of the surfaces to be bonded. The assembly of touching surfaces then is placed under at least light pressure and cooled to ambient temperature to solidify and set the adhesive. The application temperature of the adhesive is set at a level such that adequate flow is obtained under the applied pressure to obtain a good bond between the surfaces to be bonded.

The following examples are set forth to illustrate more clearly the principles and practice of the invention. Where parts and percentages are set forth, they are on a weight basis unless otherwise noted. As the examples have been transferred directly from our parent application Ser. No. 174,296, filed on July 31, 1980, they also disclose compositions of the type claimed in our related copending applications referred to supra.

EXAMPLE 1

Part A

Several hot melt adhesive formulations were prepared from (a) an alkenyl succinic anhydride prepared from a C-30+ alpha-olefin* and maleic anhydride by the procedure described in U.S. Pat. No. 4,158,664, (b) a binary copolymer of ethylene and vinyl acetate containing about 18 weight % vinyl acetate and having melt index of 2.5, and (c) a tackifying resin, the chemical identity of which is described in the footnotes to Table I. An antioxidant in the amount of 0.5% of the composition was included in each composition to prevent oxidation. Fine particles of the components first were physically admixed at ambient temperature. The physical admixture then was heated to a temperature of about 160° C. with stirring to provide a homogeneous mixture. The compositions of the products, the melt properties of compositions, and the mechanical properties of the compositions are set forth in Table I.

*The alpha-olefin employed in the synthesis was a mixture in which the lowest molecular weight component contained 30 carbon atoms with the average component containing about 38 carbon atoms.

TABLE I

| Composition | 1-A | 1-B | 1-C | 1-D | 1-E | 1-F | 1-G |
|---|---|---|---|---|---|---|---|
| Component |  |  |  |  |  |  |  |
| Ethylene Copolymer | 150 | 150 | 150 | 150 | 150 | 150 | 150 |
| Alkenyl Succinic Anhydride | 100 | 100 | 100 | 100 | 100 | 100 | 100 |
| Tackifying Resin A(1) | 150 | — | — | — | — | — | — |
| Tackifying Resin B(2) | — | 150 | — | — | — | — | — |
| Tackifying Resin C(3) | — | — | 150 | — | — | — | — |
| Tackifying Resin D(4) | — | — | — | 150 | — | — | — |
| Tackifying Resin E(5) | — | — | — | — | 150 | — | — |
| Tackifying Resin F(6) | — | — | — | — | — | 150 | — |
| Tackifying Resin G(7) | — | — | — | — | — | — | 150 |
| Antioxidant | 2 | 2 | 2 | 2 | 2 | 2 | 2 |
| Melt Properties |  |  |  |  |  |  |  |
| R & BSP, °C.(8) | 91 | 92 | 94 | 96 | 92 | 91 | 87 |
| Melt Viscosity, cps/10³ |  |  |  |  |  |  |  |
| @ 325° F. | 39 | 41.5 | 47.5 | 39.0 | 44.0 | 38.0 | 31.4 |

TABLE I-continued

| Composition | 1-A | 1-B | 1-C | 1-D | 1-E | 1-F | 1-G |
|---|---|---|---|---|---|---|---|
| @ 350° F. | 26.6 | 27.0 | 31.4 | 26.8 | 37.5 | 24.4 | 20.0 |
| @ 375° F. | 16.8 | 17.0 | 21.6 | 18.2 | 28.0 | 16.8 | 14.2 |
| @ 400° F. | 12.3 | 12.0 | 13.5 | — | 18.8 | 11.8 | 10.0 |
| Mechanical Properties | | | | | | | |
| Tensile @ Yield, psi | 500 | 939 | 1367 | 973 | 1175 | 1056 | 622 |
| Tensile @ Break, psi | 923 | 1048 | 1104 | 1412 | 883 | 1499 | 764 |
| % Elongation | 499 | 332 | 69 | 402 | 87 | 507 | 413 |

Footnotes to Table I
(1) A glycerol ester of a hydrogenated rosin having an R & BSP of 82° C. sold under the designation Foral 85.
(2) An aliphatic resin prepared from a $C_5$ diolefin having an R & BSP of 100° C. sold under the designation Statac 100.
(3) A terpene resin having an R & BSP of 100° C. sold under the designation Piccolyte S-100.
(4) A terpene-phenolic resin having an R & BSP of 100° C. sold under the designation Piccofyn A-100.
(5) A terpene-urethane resin having an R & BSP of 95° C. sold under the designation Isoterp 95.
(6) An alpha-methylstyrene/vinyl toluene resin having an R & BSP of 75° C. sold under the designation Piccotex 75.
(7) An aromatic hydrocarbon resin having an R & BSP of 58° C. sold under the designation Piccovar L-60.
(8) Ring and Ball softening point.

The mechanical properties of the compositions shown in Table I, particularly the tensile properties, are significantly higher than generally similar commercial hot melt adhesives containing microcrystalline waxes in lieu of the alkenyl succinic anhydrides. To demonstrate the magnitude of these differences, controls corresponding to each of the compositions shown in Table I were prepared. The controls were prepared by replacing the alkenyl succinic anhydride of each composition with an equivalent weight of a microcrystalline wax which melts at 180° F. The tensile properties of the compositions identified in Table I and the controls corresponding thereto are shown in Table II.

TABLE II

| Property Resin | Tensile @ Yield, psi | Tensile @ Break, psi |
|---|---|---|
| 1-A | 500 | 923 |
| 1-A Control | 598 | 645 |
| 1-B | 939 | 1048 |
| 1-B Control | 781 | 705 |
| 1-C | 1367 | 1104 |
| 1-C Control | 933 | 874 |
| 1-D | 973 | 1412 |
| 1-D Control | 612 | 738 |
| 1-E | 1175 | 883 |
| 1-E Control | 915 | 894 |
| 1-F | 1056 | 1499 |
| 1-F Control | 798 | 704 |
| 1-G | 622 | 764 |
| 1-G Control | 520 | 491 |

EXAMPLE 2

Laminates were prepared by bonding together sheets of a commercially available ABS resin, a PVC resin, and a nylon resin with adhesive compositions 1A, 1D, 1E, and 1G shown in Table I. In each case, the hot melt adhesive was applied to one surface in an amount to provide substantially 230 grams of adhesive per one square meters of glue line. The adhesive was applied at 400° F. using a Minimatic 400 gun. After the adhesive was applied, the assembly was maintained under a pressure of about 0.5 psi until the assembly cooled to ambient temperature.

Lap shear tensile values were determined on the laminates and the type of failure was noted. The results are shown in Table III, with the type of failure being indicated by the capital letters shown within parentheses following each reported lap shear tensile value. The meanings of the letter designations are:

(A)—Denotes total adhesion failure with the entire adhesive layer remaining on one lamina.
(M)—Denotes mixed adhesion failure in which some of the adhesive layer remains on both laminae.
(C)—Denotes cohesive failure in which both of the laminae, at the glue line, are covered with adhesive. This type of failure indicates that the bond between the adhesive and the laminae is higher than the bulk strength of the adhesive material.
(S)—Denotes failure of the laminae substrates with the adhesive bond remaining intact and unbroken.

TABLE III

| Adhesive Laminate Pair | 1-A | 1-D | 1-E | 1-G |
|---|---|---|---|---|
| ABS/ABS | 410(S) | 165(A) | — | 405(S) |
|  | 402(M) | 325(A) | — | 345(A) |
| PVC/PVC | 200(M) | 120(A) | 328(A) | — |
|  | 335(M) | 188(A) | 310(A) | — |
| Nylon/Nylon | 345(A) | 235(A) | — | 365(A) |
|  | 365(M) | — | — | 460(A) |

EXAMPLE 3

An additional series of hot melt adhesive formulations were prepared following the procedures described in Example 1, Part A. The compositions of this example differed from the compositions shown in Example 1 in that the ethylene copolymer employed was a binary copolymer of ethylene and vinyl acetate containing 40 weight % vinyl acetate and having a melt index of 7.5. The compositions of the products, the melt properties of the compositions, and the mechanical properties of the compositions are set forth in Table IV.

TABLE IV

| Composition | 2-A | 2-B | 2-C | 2-D | 2-E | 2-F | 2-G | 2-H |
|---|---|---|---|---|---|---|---|---|
| Component | | | | | | | | |
| Ethylene Copolymer | 150 | 150 | 150 | 150 | 150 | 150 | 150 | 150 |
| Alkenyl Succinic Anhydride | 100 | 100 | 100 | 100 | 100 | 100 | 100 | 100 |
| Tackifying Resin A (1) | 150 | — | — | — | — | — | — | — |
| Tackifying Resin B (2) | — | 150 | — | — | — | — | — | — |
| Tackifying Resin C (3) | — | — | 150 | — | — | — | — | — |
| Tackifying Resin D (4) | — | — | — | 150 | — | — | — | — |
| Tackifying Resin E (5) | — | — | — | — | 150 | — | — | — |

TABLE IV-continued

| Composition | 2-A | 2-B | 2-C | 2-D | 2-E | 2-F | 2-G | 2-H |
|---|---|---|---|---|---|---|---|---|
| Tackifying Resin F (6) | — | — | — | — | — | 150 | — | — |
| Tackifying Resin G (7) | — | — | — | — | — | — | 150 | — |
| Tackifying Resin H (8) | — | — | — | — | — | — | — | 150 |
| Antioxidant | 2 | 2 | 2 | 2 | 2 | 2 | 2 | 2 |
| Melt Properties | | | | | | | | |
| r & BSP, °C. (9) | 83 | 89 | 85 | 83 | 83 | 87 | 81 | 92 |
| Melt Viscosity, cps/$10^3$ | | | | | | | | |
| @ 325° F. | 18.2 | 29.0 | 31.0 | 24.2 | 23.2 | 23.8 | 16.1 | 48.0 |
| @ 350° F. | 12.0 | 18.4 | 17.0 | 17.0 | 15.8 | 16.8 | 12.8 | 32.0 |
| @ 375° F. | 8.8 | 12.0 | 13.5 | 9.6 | 13.2 | 9.8 | 8.9 | 15.0 |
| @ 400° F. | 6.4 | 8.4 | 9.8 | 7.0 | 9.2 | 7.2 | 6.0 | 10.0 |
| Mechanical Properties | | | | | | | | |
| Tensile @ Yield, psi | 371 | 600 | 621 | 386 | 558 | 399 | 323 | 1214 |
| Tensile @ Break, psi | 1354 | 1403 | 1531 | 997 | 1549 | 1254 | 937 | 2437 |
| % Elongation | 773 | 557 | 570 | 518 | 514 | 595 | 766 | 465 |

Footnotes to Table IV
(1) Foral 85 See footnote (1) of Table I
(2) Statac 100 See footnote (2) of Table I
(3) Piccolyte S-100 See footnote (3) of Table I
(4) Piccofyn A-100 See footnote (4) of Table I
(5) Isoterp 95 See footnote (5) of Table I
(6) Piccotex 75 See footnote (6) of Table I
(7) Piccovar L-60 See footnote (7) of Table I
(8) Phenolic resin having an R & BSP of 121–128° C. sold under the designation CK 2432.
(9) Ring and Ball softening point.

EXAMPLE 4

Laminates were prepared by bonding together sheets of a commercially available ABS resin, a PVC resin, and a nylon resin with adhesive compositions 2-A, 2-B, 1-C, 2-F, and 2-G shown in Table IV. The laminates were prepared in the identical manner described in Example 2. The lap shear tensile values were determined on the laminates and the type of failure was noted. The results are shown in Table V.

TABLE V

| Adhesive Laminate Pair | 2-A | 2-B | 2-C | 2-E | 2-F | 2-G |
|---|---|---|---|---|---|---|
| ABS/ABS | 310(M) | — | — | — | 400(A) | 258(A) |
|  | 335(A) | — | — | — | 405(A) | 335(A) |
| PVC/PVC | 300(A) | 208(A) | 370(A) | 415(A) | 380(A) | 295(A) |
|  | 315(A) | 185(A) | 280(A) | 415(A) | 362(A) | 342(A) |
| Nylon/Nylon | 272(A) | — | — | — | — | — |
|  | 228(A) | — | — | — | — | — |

EXAMPLE 5

An additional series of hot melt adhesive formulations were prepared in the same manner as described in Example 1, Part A. The primary difference in the compositions is that the ethylene copolymer employed therein was a binary copolymer of ethylene and vinyl acetate containing about 60 weight % vinyl acetate and having a melt index of 3.5. The compositions of the products, the melt properties of the composition, and the mechanical properties of the composition are set forth in Table VI.

TABLE VI

| Composition | 3-A | 3-B | 3-C | 3-D |
|---|---|---|---|---|
| Component | | | | |
| Ethylene copolymer | 150 | 150 | 150 | 150 |
| Alkenyl Succinic Anhydride | 100 | 100 | 100 | 100 |
| Tackifying Resin A (1) | 150 | — | — | — |
| Tackifying Resin C (3) | — | 150 | — | — |
| Tackifying Resin E (5) | — | — | 150 | — |
| Tackifying Resin F (6) | — | — | — | 150 |
| Antioxidant | 2 | 2 | 2 | 2 |
| Melt Properties | | | | |
| R & BSP, °C. (8) | 86 | 96 | 102 | 94 |
| Melt Viscosity, cps/$10^3$ | | | | |
| @ 325° F. | 24.8 | 6.8 | 38.0 | 21.0 |
| @ 350° F. | 15.2 | 3.7 | 22.4 | 16.4 |
| @ 375° F. | 9.8 | 2.4 | 13.2 | 14.4 |
| @ 400° F. | 7.0 | 1.2 | 10.0 | 11.2 |
| Mechanical Properties | | | | |
| Tensile @ Yield, psi | 304 | 475 | 929 | 325 |
| Tensile @ Break, psi | 297 | 335 | 1999 | 816 |
| % Elongation | 970 | 95 | 357 | 453 |

Footnotes to Table VI
(1) Foral 85 See footnote (1) of Table I
(3) Piccolyte S-100 See footnote (3) of Table I
(5) Phenolic CK 2432 See footnote (8) of Table IV
(6) Isoterp 95 See footnote (5) of Table I
(8) Ring and Ball softening point

EXAMPLE 6

A series of laminates were prepared from sheets of a commercially available ABS resin, a PVC resin, and a nylon resin with adhesive compositions 3-A, 3-B, and 3-D shown in Table VI. The laminates were prepared in the same manner as described in Example II. Lap shear tensile values were determined on the laminates and the type of failure was noted. The results are shown in Table VII.

TABLE VII

| Adhesive Laminate Pair | 3-A | 3-B | 3-D |
|---|---|---|---|
| ABS/ABS | 325(A) | 147(AM) | 163(A) |
|  | 335(A) | 117(A) | 170(A) |
| PVC/PVC | 250(M) | 142 | — |
|  | 260(M) | 175(AM) | — |

EXAMPLE 7

Another series of hot melt adhesive formulations were prepared in the manner described in Example 1, Part A. The ethylene copolymer included in the formulations was a binary copolymer of ethylene and methyl acrylate containing about 20 weight % methyl acrylate and having a melt index of 2.0. The compositions of the products, melt properties of the compositions, and the mechanical properties of the compositions are set forth in Table VIII.

TABLE VIII

| Composition | 4-A | 4-B | 4-C |
|---|---|---|---|
| Component | | | |
| Ethylene Copolymer | 150 | 150 | 150 |
| Alkenyl Succinic Anhydride | 100 | 100 | 100 |
| Tackifying Resin A (1) | 150 | — | — |
| Tackifying Resin D (4) | — | 150 | — |
| Tackifying Resin E (5) | — | — | 150 |
| Antioxidant | 2 | 2 | 2 |
| Melt Properties | | | |
| R & BSP, °C. (8) | 93 | 93 | 95 |
| Melt Viscosity, cps/10$^3$ | | | |
| @ 325° F. | 41.5 | 44.5 | 35.8 |
| @ 350° F. | 27.0 | 28.0 | 24.6 |
| @ 375° F. | 18.5 | 18.5 | 18.6 |
| @ 400° F. | 13.0 | 12.5 | 11.4 |
| Mechanical Properties | | | |
| Tensile @ Yield, psi | 545 | 783 | 887 |
| Tensile @ Break, psi | 694 | 1140 | 662 |
| % Elongation | 525 | 520 | 155 |

(1) Foral 85 See footnote (1) of Table I
(4) Piccofyn A-100 See footnote (4) of Table I
(5) Piccotex 75 See footnote (6) of Table I
(8) Ring and Ball softening point

EXAMPLE 8

Another series of hot melt adhesive formulations were prepared as described in Example 1, Part A. The ethylene copolymer included in the compositions was a binary copolymer of ethylene and ethyl acrylate containing about 18% ethyl acrylate and having a melt index of 6.0. The compositions of the product, the melt properties of the compositions, and the mechanical properties of the composition are set forth in Table IX.

TABLE IX

| Composition | 5-A | 5-B | 5-C |
|---|---|---|---|
| Component | | | |
| Ethylene Copolymer | 150 | 150 | 150 |
| Alkenyl Succinic Anhydride | 100 | 100 | 100 |
| Tackifying Resin A (1) | 150 | — | — |
| Tackifying Resin D (4) | — | 150 | — |
| Tackifying Resin E (5) | — | — | 150 |
| Antioxidant | 2 | 2 | 2 |
| Melt Properties | | | |
| R & BSP, °C. (8) | 94 | 92 | 95 |
| Melt Viscosity, cps/10$^3$ | | | |
| @ 325° F. | 25.2 | 23.6 | 24.6 |
| @ 350° F. | 16.8 | 14.8 | 16.2 |
| @ 375° F. | 11.4 | 10.0 | 10.8 |
| @ 400° F. | 8.0 | 7.0 | 7.8 |
| Mechanical Properties | | | |
| Tensile @ Yield, psi | 505 | 595 | 670 |
| Tensile @ Break, psi | 820 | 700 | 620 |
| % Elongation | 605 | 350 | 250 |

(1) Foral 85 See footnote (1) of Table I
(4) Piccofyn A-100 See footnote (4) of Table I
(5) Piccotex 75 See footnote (6) of Table I
(8) Ring and Ball softening point

EXAMPLE 9

Laminates were prepared by bonding together sheets of a commercially available ABS resin, PVC resin, and a nylon resin employing the techniques described in Example 2. The adhesive compositions employed were 4-B, 5-A, 5-B, and 5-C shown in Tables VIII and IX. Lap shear tensile values were determined on the laminates and the type of failure was noted. The results are shown in Table X.

TABLE X

| Adhesive Laminate Pair | 4-B | 5-A | 5-B | 5-C |
|---|---|---|---|---|
| ABS/ABS | 180(A) | 222(A) | 412(S) | 100(A) |
|  | 270(A) | 242(A) | 310(A) | 150(A) |
| PVC/PVC | 115(A) | 185(M) | 155(A) | 180(A) |
|  | 170(A) | 292(M) | 132(A) | 175(A) |
| Nylon/Nylon | — | — | 585(A) | 250(A) |
|  | — | — | 510(A) | 355(A) |

What is claimed:

1. A hot melt adhesive composition consisting essentially of:
   (a) 10–30 weight % of an alkenyl succinic anhydride,
   (b) 20–60 weight % of an ethylene copolymer, and
   (c) 10–40 weight % of a tackifying resin;
   said alkenyl succinic anhydride having the structure:

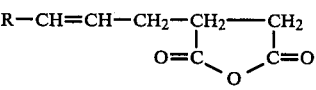

where R is an alkyl group containing at least about 15 carbon atoms; said ethylene copolymer having polymerized therein at least 40 weight % polymerized ethylene and the balance one or more polymerized monomers from the group consisting of vinyl acetate, acrylic and methacrylic acid and alkyl esters of acrylic and methacrylic acid; and said tackifying resin being a rosin ester having a Ring and Ball softening temperature of about 65°–140° C. and formed by esterifying a rosin acid with a di-, tri-, or tetra-hydroxy aliphatic alcohol.

2. A composition of claim 1 containing about 15–25 weight % of the alkenyl succinic anhydride, about 25–50 weight % of the ethylene copolymer, and about 15–35 weight % of the tackifying resin.

3. A composition of claim 1 in which the ethylene polymer has a melt index of about 1–100.

4. A composition of claim 1 in which the ethylene copolymer is a binary copolymer of ethylene and vinyl acetate.

5. A composition of claim 1 in which the ethylene copolymer is a binary copolymer of ethylene and an alkyl ester of acrylic or methacrylic acid.

6. A composition of claim 2 in which the ethylene copolymer is a binary copolymer of ethylene and vinyl acetate.

7. A composition of claim 2 in which the ethylene copolymer is a binary copolymer of ethylene and an alkyl ester of acrylic or methacrylic acid.

8. A composition of claim 3 in which the ethylene copolymer is a binary copolymer of ethylene and vinyl acetate.

9. A composition of claim 3 in which the ethylene copolymer is a binary copolymer of ethylene and an alkyl ester of acrylic or methacrylic acid.

* * * * *

UNITED STATES PATENT AND TRADEMARK OFFICE
CERTIFICATE OF CORRECTION

PATENT NO. : 4,325,853
DATED : April 20, 1982
INVENTOR(S) : Vikramkumar Acharya and Pallavoor R. Lakshmanan It is certified that error appears in the above–identified patent and that said Letters Patent are hereby corrected as shown below:

The formula appearing at column 2, line 5, and column 10, line 25, is:

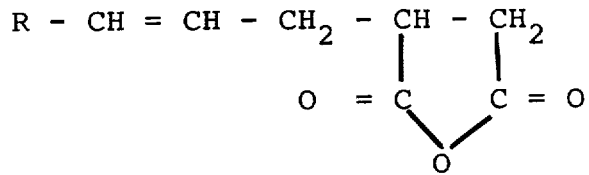

Signed and Sealed this

Twenty-first Day of September 1982

[SEAL]

Attest:

Attesting Officer

GERALD J. MOSSINGHOFF

Commissioner of Patents and Trademarks